United States Patent
Bochereau

[11] Patent Number: 5,914,966
[45] Date of Patent: Jun. 22, 1999

[54] SYSTEM FOR THE MONITORING AND MANAGEMENT OF A POINT-TO-MULTIPOINT ACCESS NETWORK

[75] Inventor: Jean-Piere Bochereau, Pleumeur Bodou, France

[73] Assignee: France Telecom, Paris, France

[21] Appl. No.: 08/747,626

[22] Filed: Nov. 13, 1996

[30] Foreign Application Priority Data

Nov. 15, 1995 [FR] France ................. 95 13753

[51] Int. Cl.[6] ................. G01R 31/28; G06F 11/00
[52] U.S. Cl. ................. 371/20.1; 395/183.19; 395/185.09; 395/184.01
[58] Field of Search ................. 371/20.1, 32; 364/927.81, 364/265.1, 265.2, 578, 933.8, 944.5, 242.94, 242.96, 242.5; 395/185.01, 185.02, 185.09, 182.02, 183.08, 183.09, 183.19, 183.22, 184.01, 500

[56] References Cited

U.S. PATENT DOCUMENTS

| | | | |
|---|---|---|---|
| 4,868,825 | 9/1989 | Koeppe | 371/23 |
| 5,163,051 | 11/1992 | Biessman et al. | 371/5.1 |
| 5,265,254 | 11/1993 | Blasciak et al. | 395/704 |
| 5,442,639 | 8/1995 | Crowden | 371/20.1 |
| 5,519,830 | 5/1996 | Opoczynski | 395/182.02 |
| 5,604,895 | 2/1997 | Raimi | 364/578 |
| 5,655,068 | 8/1997 | Opoczynski | 395/182.02 |

FOREIGN PATENT DOCUMENTS 0 603 056  6/1994  European Pat. Off. .

OTHER PUBLICATIONS

Electronics and Communication Engineering Journal, vol. 4, No. 4, Aug. 1992, pp. 243–251, Migotti T et al: "Performance Evaluation of Broadband Connections and Services under Varying Traffic Loads".

Primary Examiner—Trinh L. Tu
Attorney, Agent, or Firm—Laff, Whitesel, Conte & Saret, LTD.

[57] ABSTRACT

The invention relates to a system for monitoring and managing a point-to-multipoint access network to connect a line terminal $(10_1)$ to a plurality of network terminations (30). Each network termination (30) comprises facilities (31) for detecting transmission errors. For each error that is so detected, facilities (31) generate a word (m) which is representative of the detected error. Processing facilities (33) are provided in order to process the words generated by the detection facilities (31). In each network termination (30), there are simulation facilities (38) for generating simulated error words (ms) and facilities (32) for replacing for the errors which are detected by the detection facilities and by the simulated error words (ms) generated by the said simulation facilities. The point is to provide known signals which can be monitored in order to test the accuracy of the equipment.

10 Claims, 2 Drawing Sheets

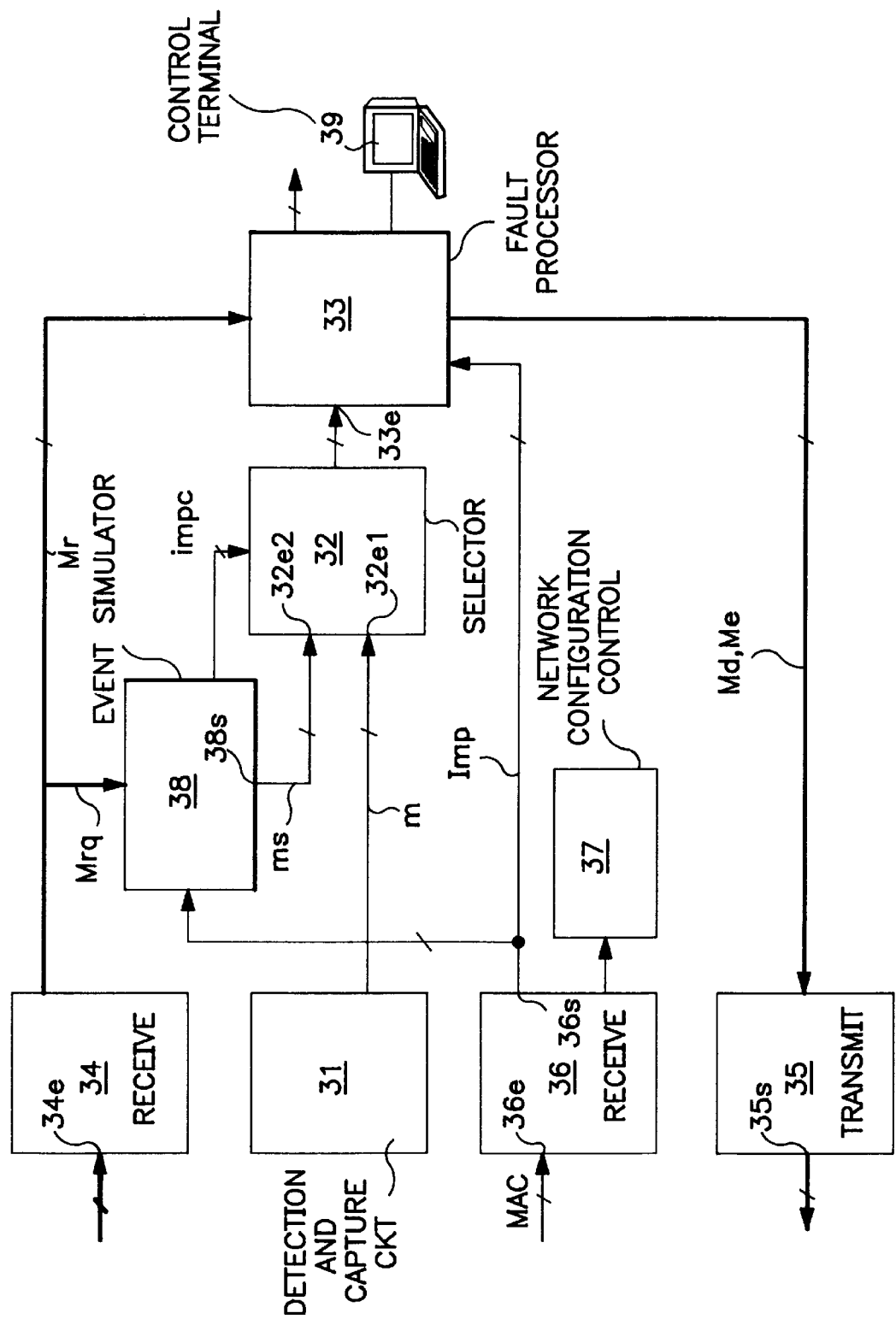

SYSTEM FOR THE MONITORING AND MANAGEMENT OF A POINT-TO-MULTIPOINT ACCESS NETWORK

FIELD OF INVENTION

The present invention relates to a system for monitoring and management of a point-to-multipoint access network, and in particular an optical access network.

DESCRIPTION OF RELATED ART

A point-to-multipoint access network of the optical access network type is generally comprised of a plurality of optical network terminations, each located at client's premises, connected by means of optical links comprised of fiber-optic cables and couplers to an optical line terminal- The optical line terminal is connected to equipment which ensures the connection between the access network and one or more other networks, such as, for example, an ATM transport network. The line terminal in turn takes care of the transmission control functions on the access network, its configuration, and its maintenance. Each network termination is designed to allow for a connection which will provide the services offered to the subscribers, The applications may be applications for residential customers or professional applications. It may be noted that a distinction is generally made, among residential customers between, on the One hand, those customers who are entitled to have access to videocommunications services and, on the other, those customers who only have access to basic ISDN service.

The principle is known of providing such an access network for a monitoring and management system in order to assess performance and anomalies.

In optical access networks which are of the point-to-multipoint type, as networks which are the object of the present invention, transmission between a line terminal to the network terminations is transmitted on a channel which is referred to as a down-link, while the channel between a network termination and the associated line terminal is transmitted on another channel referred to as the up-link. While the determination of the performance values and any anomalies is carried out by the line terminal, such determination on the down-link is carried out by each network termination.

For the determination on the down-link channel, each network termination accordingly includes a detection circuit for transmission errors incurred during the transmission between the line terminal and the said network termination, the said circuit accordingly supplying, for each error detected, a word which is representative of the said error detected. It also comprises a processing circuit intended to receive the words generated by the said detection circuit and to ensure the processing of the performance values on the basis of the words received during a predetermined period. This processing circuit sends an error message to the associated line terminal for each error detected, the said error message characterizing the error which has been detected and, after a predetermined period, generates a report message on the performance values of the terminal concerned. The error message and the report message are transmitted to the said line terminal on the up-link channel by the OAM cells. The line terminal is connected, via management equipment and a telecommunications management network, to a network administration unit, to which it then sends the error messages and the performance messages for the access network to which it belongs. An analysis of these performance values and these errors conducted by the said network administration unit allows for preventive maintenance and therefore improves the availability of the access network.

This monitoring and management system provides complete satisfaction, but it will be understood that a problem occurs if one of the circuits installed in the network terminations becomes faulty. In this case, in fact, the operator may implement a maintenance operation which is not necessary for the network In order to avoid this type of situation and in order to be able to take action on the faulty monitoring and management system, the attempt has been made to implement means which will allow for the operational statue of the monitoring and management system of each terminal to be identified in an optical access network.

SUMMARY OF THE INVENTION

The object of the invention is therefore to propose such facilities.

For this purpose, a monitoring and management system for a point-to-multipoint access network in accordance with the invention is characterized in that it comprises, in each network termination, simulation devices to generate simulated error words, and facilities to replace the said error words which are detected by the detection facilities by the said simulated error words generated by the said simulation devices.

According to another embodiment of the invention, the said messages are, on the one hand, fault messages which characterize the error detected by the said detection facilities and, on the other, performance report messages.

According to another feature of the invention, the said simulation devices generate simulated error words on the basis of a test request message received from the line terminal. to another feature of the invention, the said processing facilities provide processing for the performance characteristics on the basis of the said simulated words for a period which is specified in the teat request message and generate the said performance report message which is transmitted to the said line terminal.

According to another feature of the invention, the said processing facilities provide for the processing of the performance characteristics on the basis of the said simulated words for a predetermined period and generate the said performance report message which is transmitted to the said line terminal.

According to another feature of the invention, at least one profile of the test characterized by the predetermined error words is stored at the line terminal, as well as the predetermined times of issue of the said error words and a predetermined test period duration, a profile being transmitted to the said simulation facilities in order to generate the predetermined error words at the predetermined times during a predetermined period of time in the said profile.

According to another feature of the invention, as an alternative of the previous embodiment, at least one test profile is stored at the said line terminal, the said profile being characterized by predetermined error words, predetermined issue times for the said error words and a predetermined test duration period, the said profile, or each profile, being stored at each network termination, an identifier for a profile being sent from the line terminal to the said simulation facilities of a network termination in order to generate the predetermined error words at the predetermined times during a predetermined period of time in the said profile.

According to another feature of the invention, facilities are included for comparing the fault messages and the performance characteristic messages issued by a network termination, with the reference messages corresponding to the said test profile which is being applied, and facilities for deriving from the result of this comparison whether or not the system is properly operating.

If the said access system comprises management and maintenance up-links and down-links, the said test request message is preferably transmitted to a network termination via the management and maintenance down-link, the said error and performance messages being transmitted via the management and naintenance up-link.

According to another feature of the invention, the said simulation facilities generate the simulated error words after the receipt of a synchronisation code issued from the line terminal.

The above mentioned features of the invention as well as others, will become clearer after reading the following description of an embodiment, the said description being provided in association with the accompanying drawings, in which;

BRIEF DESCRIPTION OF DRAWINGS

FIG. 2 is a synoptic diagram of a monitoring and management system according to the invention.

DETAILED DESCRIPTION OF PREFERRED EMBODIMENTS

Figure 1:
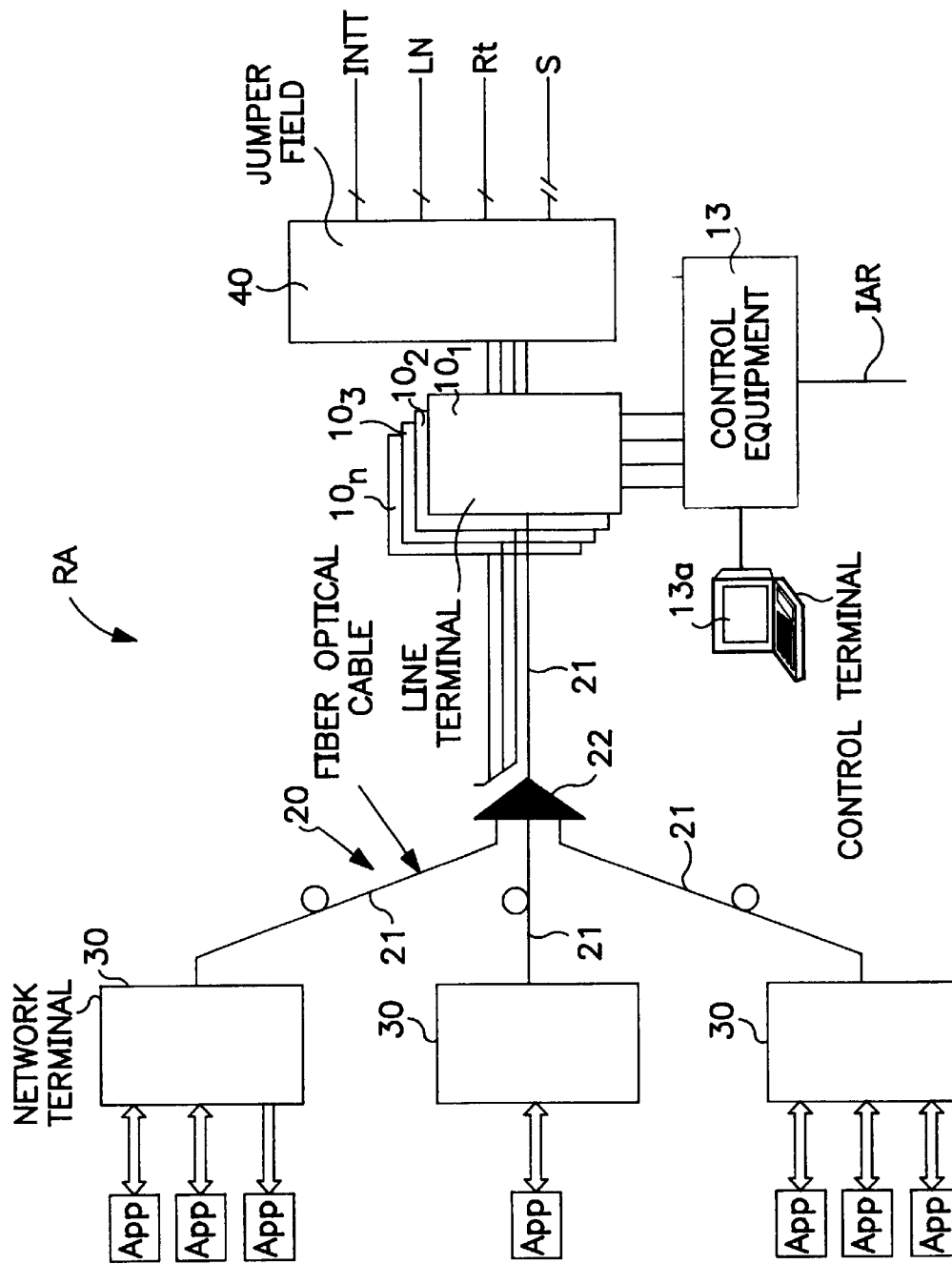
FIG. 1 is a synoptic diagram of a point-to-multipoint network using a monitoring and management system according to the invention.

In FIG. 1, an access network can be seen which comprises a line terminal $10_1$ which is connected, via a network 20 that is made of fiber optic cables 21 and at least one coupler 22, to a plurality of network terminations 30.

In this FIG. 1 other line terminals $10_2$ to $10_n$ can be seen, pertaining to other access networks (not shown), also consisting of an optical network and network terminations.

Each fiber optic network 20 is an optical network of the point-to-multipoint type, for example on single mode fiber. The transmissions between the line terminal $10_1$ to the network terminations 30 are made via a channel referred to as the down-link, while those between a network termination 30 and the associated line terminal $10_1$ are made on a channel referred to as the up-link.

The transmission of the information on the down-link is ensured by cells, for example of the ATM type (Asynchronous Transfer Mode), which are grouped on frames. A frame of this type comprises an OAM cell (Operation and Maintenance), which comprises, inter alia, a field which forms the support for the management and monitoring messages and will be referred to hereinafter as the OAM down-link channel, and another field carrying the data for frame management and shared access, which will be referred to hereinafter as the MAC field (Medium Access control). This MAC field is formed, in particular, from a sub-field which refers to the termination of the network to which a command is destined, the code of which in described in another sub-field. Such a command is, as can be seen below, an initialisation command or a configuration command.

The transmission of data on the up-link channel is provided by discrete blocks issued by the various network terminations 30, by means of MTDA, multiple time distribution access. Certain blocks are made up of OAM cells which carry the management and maintenance information thus creating an OAM up-link channel.

Only three network terminations 30 are shown for ease of understanding in FIG. 1. These network terminations 30 are generally located at the customer's premises or with a group of customers, and are intended primarily to be connected to App applications, for example by way of the appropriate links. Such applications are designed to accommodate telephone services, ISDN services, digital television services, video-telephony services, etc. They are intended, for example, for residential users and/or small professional businesses.

The optical line terminal $10_1$ to $10_n$ are connected, respectively, to the corresponding inputs of a service jumper field 40, which is connected upstream to a transport network RT and to other networks or applications through the medium of telecommunications interfaces INTT or digital lines LN, etc. It may equally well be connected to servers S, such as, for example, video or audio servers.

The terminals of the optical line $10_1$ to $10^n$ as well as the juniper field 40, are connected to management equipment 13, which provides for the interface with a network administration unit (not shown). The management equipment 13 is connected in order to achieve this, via an interface IAR to a telecommunications management network. The administration unit is provided in order to ensure management, at a higher level, of the transport network RT to which the access network RA is connected.

The management equipment 13 is also provided in order to ensure local management of the access network RA. In order to do this, it may be connected to a terminal 13a. The local management of the access network RA relates, on the one hand, to the configuration of the said network RA, and, on the other hand, to the monitoring of its quality.

The configuration of the network RA consists essentially of the attribution of identification numbers to the network terminations 30, of compensation for the delays due to the propagation of the optical signals between the network terminals 30 and the line terminals 10, of the validation or inhibition of the emission by the network terminals 30 of signals on the up-link channel, and, finally, of the monitoring and command of the optical power values emitted by the network terminations 30. It likewise consists of the dynamic allocation of the broadband output for residential customers, referred to as the VT type, and for professional customers who may have access, inter alia, to telecommunications services.

The monitoring of the quality of the network RA consists essentially of monitoring and signalling of faults such as line errors LE, E-BER faults generated when the Bit Error Rate BER exceeds a given threshold, loss of frame (synchronisation) LOF, loss of (reception) signal LOS, and clock recovery failure CRF. It also consists of the processing of performance characteristics, i.e. the calculation of the number of line errors, the number of seriously-errored seconds SES, i.e. the number of seconds which comprise more than a predetermined rate of errored blocks or faults, the number of errored seconds ES, i.e. the number of seconds which comprise at least one errored block or fault, the time of any unavailability states US of an item of equipment, an item of equipment being considered as unavailable if the number of consecutive seriously errored seconds SES exceeds a certain threshold, and the number of short interruption events SIE corresponding to the periods of unavailable time does not exceed a predetermined number of seconds.

It also consists of the transmission to the management equipment 13 of the fault or error messages which characterize the fault or error which has been detected, and the performance messages, consisting of a report on the performance characteristics over a predetermined period. It is likewise the management equipment 13 which ensures the interface link with the administration of the network which will carry out the performance analysis.

In the network RA, the local management functions described above are implemented in each of the terminations 30 in a termination monitoring and management system. FIG. 2 shows an embodiment of a monitoring and management system for a network termination which will allow for the implementation of these local management functions.

This system consists of a circuit 31 for the detection and capture circuit 31 for the error events which may appear during the transmission of the data from the line terminal $10_1$ to the termination 30 concerned. These events are, for example, line errors LE, loss of frame (synchronisation) LOF, loss of (reception) signal LOS, and clock recovery failure CRF.

Once it has detected such an event, the circuit 31 delivers a word m, which is transmitted via a selector 32 the function of which will be explained below to an input 33e of a circuit 33 for the processing of faults and performance values.

The monitoring system also comprises a circuit 34, which is intended to receive, at its input 34e, the down-link OAM (Operation And Maintenance) channel, which has been issued by the line terminal $10_1$ to the network terminations 30 in the down-link OAM cells, and a circuit 35 which is provided in order to issue, at its output 35e, the up-link OAM channel, the destination of which is the line terminal $10_1$ in the up-link OAM cells.

It also comprises a circuit 36 of which the input 36e is provided to receive the MAC field issued by the line terminal $10_1$ in the down-link OAM cells. If the MAC cell contains a configuration command, the circuit 36 delivers the configuration data to a circuit 37 which ensures the configuration of the network termination 30 under consideration. If the field MAC corresponds to a performance request, the circuit 36 delivers a performance synchronization signal IMP at its output 36s.

The reception circuit 34 for the down-link OAM channel is connected to the processing circuit 33 in order to provide it with monitoring and management messages Mr contained in the down-link OAM cells received in the circuit 34 from the line terminal $10_1$. The processing circuit 33 is connected to the circuit 35 in order, on the one hand, to deliver to it the fault messages Md at the time at which they are detected by the detection circuit 31 and, on the other hand, to provide the performance report messages Me. These two particular types of messages Md and Me are transmitted via the up-link channel OAM to the line terminal 10.

To do this, the processing circuit 33 is designed in order to transmit to the circuit 35 the messages Md as soon as a word m appears at its input 33e, each message Md characterizing the fault(s) represented by the word m. To do this, the circuit 33 carries out, for example, a processing procedure which consists of only considering that a fault has really disappeared after a predetermined period has elapsed after its disappearance. The circuit 33 is likewise designed in order to calculate under the command of the performance synchronisation signal IMP issued by the circuit 36, and on the basis of the words m which are sent to it by the circuit 31 in a given period of time, either defined in the message Mr or predefined, the number of each type of event, such as seriously errored seconds SES, errored seconds ES, unavailability states US, and short interruption events SIE. It forms the report message Me, which is transmitted under the command from a message Mr delivered from the reception circuit 34 to the transmission circuit 35 with a view to its being transmitted to the line terminal This message Me contains the performance values for the link between the central unit 10 and the termination 30 concerned.

The monitoring system of the invention also comprises an event simulation circuit 38 which is provided in order to receive from a reception circuit 34 a message Mrq as a test request which the said reception circuit has also received, via the OAM down-link channel, from the line terminal $10_1$. The circuit 38 is provided in order to deliver from its output 38s a number of words ms which are representative of error events. These words ms are transmitted on a second input 32e2 of the selector 32. It should be borne in mind that the error word m from the output of the error detector 31 is presented at the first input 32e1 of the selector 32.

The error words ms generated by the simulation circuit 36 are identical in structure to the error words m which are generated by the detection circuit 31.

A test request formulated by the line terminal $10_1$ is transmitted to the termination 30 concerned by an appropriate message Mrq on the down-link OAM channel, received by the reception circuit 34. This test request message Mrq is supplied to the simulation circuit 38 which then stands by to receive a performance request message in the form of signal IMP delivered by the circuit 36 so as to start the simulation of error words.

Once the circuit 36 receives the said synchronisation code transmitted by the terminal $10_1$ and contained in the field MAC of the down-link OAM channel, the circuit 36 delivers the signal IMP at its output 36a. This pulse IMP is transmitted to the simulation circuit 38 which, on the one hand, starts to deliver from its output 38s, simulated error messages ms and which, on the other hand, issues commands to the selector 32 in such a way that the words ms generated by the circuit 38 are transmitted to the processing circuit 33. They are likewise transmitted, as above, to the processing circuit 33 which then starts the analysis and the calculation of the number of different errors generated by the simulation circuit 38; this is done with a view to the formation of the fault messages Md and the performance report Me. The command for the selector 32 is effected by the transmission of a command pulse impc from an appropriate input of the selector 32, in such a way that its output delivers the words which are present at its input 32e2, and no longer those which are present at the input 32e1.

The simulation circuit 38 generates the error words ms in accordance with a number of function modes. It can do this, for example, on the basis of the information which is contained in the test request message Mrq.

This information may be presented in the form of test profiles characterized by predetermined error words corresponding to line errors LE, E-BER faults, loss of frame synchronisation LOF, loss of reception signal LOS, and clock recovery failure, as well as the predetermined times of issue of the said error words. These profiles are stored at the line terminal $10_1$ and are issued in the direction of a network termination 30 in a message Mrq. The message Mrq allows the simulation circuit 38 to issue the simulated error words which correspond to the profile which it contains.

Another embodiment of the invention provides for the profiles such as have just been described to be stored, on the one hand, at the line terminal $10_1$, and, on the other hand, at each of the network terminations 30. The line terminal $10_1$ then issues, toward a subscriber terminal 30, one or more profile identifiers in the message Mrq. The identifier(s) received in an Mrq message allow the simulation circuit 38 to issue the simulated error words which correspond to the profile(s) indexed by this/these identifier(s).

The duration of the test is likewise defined in each of the profiles.

During the test, the fault messages Md are transmitted to the emission circuit 35 and, by way, of the up-link OAM channel to the terminal $10_1$. Likewise, during the test, at a defined or predefined frequency, the processing circuit 33 generates performance report messages Me which are transmitted, via the emission circuit 35 and the OAM return link to the line terminal $10_1$.

The line terminal $10_1$ transmits the messages Md and Me to the management equipment 13 which analyses them in order then to derive whether or not the monitoring and management system of the access network is functioning correctly.

It may be noted that, in order for the line terminal $10_1$ to he able to recognise the fault messages Md and performance messages Me generated by the circuit 33 when the monitoring system is in its simulation periods, a specific header is allocated to the cells carrying these messages.

During the whole of the test period the services provided by the terminations and their configurations are not affected in any manner; only the monitoring of the quality of the termination is interfered with, in as much as, while it is not operational, the processing circuit 33 is no longer analysing the words m which are generated by the detection circuit 31.

Once the test has been concluded, the simulation circuit 38 commands the selector 32 in such a way that it is now the words m deriving from the circuit 31 which are transmitted to the processing circuit 33.

It should be noted that it is possible to provide for the stoppage of the test operation at any time, either by means of an equipment initialization command deriving from the line terminal $10_1$ in the form of an initialization code in the field MAC of the down-link channel, or in the form of a specialised message on the OAM down-link channel.

Throughout the duration of the operation of the test, the fault messages Md and performance messages Me can be displayed on any appropriate media at the level of the line terminal $10_1$ as well as at the level of the network termination 30 (for example by means of a screen 39) in order to carry out a comparison in the event of doubt.

Each test operation is capable of being perfectly reproduced due to the fact that its actuation is controlled by an appropriate code in the field MAC, and received by the circuit 36. It can then be envisaged that test profiles can be stored in the memory at the level of the line terminal $10_1$ the said profiles being characterized by predetermined error words, predetermined times of generation of the error words, and a predetermined duration of the test. The message Mrq which is transmitted to the network termination 30, contains a profile which initializes the simulation circuit 38, in order that the said circuit issues the simulated error words ms, corresponding to the words predetermined at the predetermined times and during the predetermined duration. At the end of the test, after having received the corresponding messages Md and Me, the line terminal $10_1$ carried out an automatic comparison of the messages Md and Me received, with the reference messages Md' and Me', which correspond to the profile which was contained in the message Mrq, and then signals the result of this comparison ("Test, good" or "Test bad"). In the event of the test being negative, a subsequent analysis of the results obtained may then help in identifying those parts of the equipment which are faulty.

It may be noted that the storage in the memory of the test profiles may be carried out at the level of the line terminal $10_1$, as well as at the level of the network terminations 30, although it is no longer necessary for the message Mrq to contain them.

The test device of the invention represents an interesting tool for the operator in order to allow for the identification of the operational status of the equipment of each network termination and in order to be able to carry out their replacement, even partially, by remote control.

In a preferred embodiment, the processing circuit 33 is a circuit comprising a micro-controller which carries out the calculations necessary by means of a program contained in its memory. It is likewise the simulation circuit 38. To advantage, use can be made of two different micro-controllers, in particular for reasons of reliability, but the possibility is not excluded of carrying out both functions as well as that which is carried out by the switching unit 32 by one single micro-controller.

In a general manner, it will be understood that the invention likewise relates to embodiments in which the circuits of the system, and, in particular, the simulation circuits 38 and the processing circuits 33, are comprised of all the resources which will allow for the functions referred to above to be carried out It is therefore possible in particular to speak of simulation resources 38 and processing resources 33.

The claimed invention is:

1. A system for supervision and control of a point-to-multipoint access network, said system comprising means for connecting a line terminal ($10_1$) to a plurality of network terminations (30), each of said network terminations (30) comprising resource means (31) for detecting transmission errors introduced during a transmission between said line terminal ($10_1$) and said network terminations (30) and for generating an error word (m) which is representative of each of said detected errors, processing resource means (33) for processing the error words generated by said detection resource means (31) and for forming messages (Md, Me) associated with said error word (m), transmission resource means (35) for transmitting said messages (Md, Me) to said line terminal ($10_1$) which then determine line errors, simulation facilities (38) for generating simulated error words (ms) and means (32) for replacing said error word (m) by said simulated error words (ms) generated by said simulation facilities (38), said processing resource means (33) forming the messages (Md, Me) on a basis of said simulated error words (ms) which are transmitted to said line terminal ($10_1$) by transmission means (35), said line terminal ($10_1$) determining whether or not the processing means (33) are or are not working correctly responsive to reception of said messages (Md, Me).

2. A system for supervision and control in accordance with claim 1 wherein said messages are performance report messages (Me) and are fault messages (Md) determined on a basis of the errors words (m) or the simulated error words (ms).

3. A system for supervision and control in accordance with claims 1 or 2, wherein said line terminals ($10_1$), may transmit a test request message (Mrq), and further wherein said simulation facilities (38) generate said simulated error words (ms) on a basis of a test request message (Mrq) received from the line terminal ($10_1$).

4. A system for supervision and control in accordance with claim 3 wherein at least one test profile is stored in said line terminal ($10_1$), said test profile being characterized by predetermined error words, predetermined emission times for said error words, and a predetermined duration for a test, said test profile being contained within the test request message (Mrq) being transmitted to said stimulation facilities (38) in order to generate pre-determined simulated words at a predetermined emission time during a predetermined duration respectively characterizing said profile.

5. A system for supervision and control in accordance with claim 4 further comprising facilities for comparing said fault messages (Md) and the performance messages (Me) issued by network termination (30) with reference messages (Md' and Me') corresponding to said profile of the test that is carried out test that is carried out by said network termination (30), and means for deriving a result from this comparison as to whether or not said system is operating correctly.

6. A system for supervision and control in accordance with claim 3 wherein at least one test profile is stored in said line terminal ($10_1$), said test profile being characterized by predetermined error words, predetermined emission times for said error words, and a predetermined duration for a test, means for storing said profile at each of said network terminations (30), a profile identifier being contained within a test request message (Mrq) being transmitted from the line terminal ($10_1$) to said stimulation facilities of said network termination in order to generate the predetermined stimulated error words at the predetermined times during a predetermined duration respectively characterizing said profile corresponding to said identifier.

7. A system for supervision and control in accordance with claim 6 further comprising facilities for comparing said fault messages (Md) and the performance messages (Me) issued by network termination (30) with reference messages (Md' and Me') corresponding to said profile of the test that is carried out by said network termination (30), and means for deriving a result from this comparison as to whether or not said system is operating correctly.

8. A system for supervision and control in accordance with one of the claims 1 or 2 wherein said process resources means (33) processes performance values on a basis of the simulated error words (ms) during a predetermined time period, and generates said message (Me) which is transmitted to said line terminal ($10_1$).

9. A system for supervision and control in accordance with claim 1 wherein said line terminal ($10_1$), may transmit a test request message (Mrq), said test request message (Mrq) being transmitted to network termination (30) on a down-link management and maintenance channel, while said message (Md) and (Me) is being transmitted via an up-link management and maintenance channel.

10. A system for supervision and control in accordance with one of the claims 1 or 2 wherein the simulation facilities (38) generate simulated error words (ms) after receiving a synchronization code issued by the line terminal ($10_1$).

* * * * *